(12) United States Patent
Lu et al.

(10) Patent No.: US 12,213,105 B2
(45) Date of Patent: Jan. 28, 2025

(54) SIDELINK TRANSMISSION METHOD AND SIDELINK TRANSMISSION APPARATUS

(71) Applicant: GUANGDONG OPPO MOBILE TELECOMMUNICATIONS CORP., LTD., Dongguan (CN)

(72) Inventors: Qianxi Lu, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 604 days.

(21) Appl. No.: 17/534,668

(22) Filed: Nov. 24, 2021

(65) Prior Publication Data

US 2022/0086806 A1    Mar. 17, 2022

Related U.S. Application Data

(63) Continuation of application No. PCT/CN2019/093893, filed on Jun. 28, 2019.

(51) Int. Cl.
*H04W 72/02*    (2009.01)
*H04L 1/08*    (2006.01)
(Continued)

(52) U.S. Cl.
CPC ............... *H04W 72/02* (2013.01); *H04L 1/08* (2013.01); *H04L 1/1812* (2013.01); *H04L 5/0053* (2013.01)

(58) Field of Classification Search
CPC ......... H04W 72/02; H04W 4/06; H04W 4/40; H04W 4/46; H04L 1/08; H04L 1/1812;
(Continued)

(56) References Cited

U.S. PATENT DOCUMENTS 7,873,007 B2    7/2011 Kim et al.
2010/0067468 A1*   3/2010 Ho ..................... H04L 1/1812
714/748

(Continued)

FOREIGN PATENT DOCUMENTS

CN    105991247 A    10/2016
CN    107079437 A    8/2017
(Continued)

OTHER PUBLICATIONS

Examination Report of EP Application No. 19935148.7, dated Jan. 26, 2023.
(Continued)

*Primary Examiner* — Nizam U Ahmed
(74) *Attorney, Agent, or Firm* — Sheppard, Mullin, Richter & Hampton LLP

(57) ABSTRACT

Disclosed is a method for transmitting sidelink data. The method comprises: a terminal device determining a target resource and target data from among at least one sidelink transmission resource and at least one piece of data, wherein an HARQ feedback mode of the target data matches the target resource; and the terminal device sending, on the target resource, the target data. By means of the method, a
(Continued)

terminal device can determine the reception of sidelink data on the basis of different HARQ feedback modes, thereby improving the flexibility of sidelink feedback.

8 Claims, 8 Drawing Sheets

(51) Int. Cl.
*H04L 1/1812* (2023.01)
*H04L 5/00* (2006.01)

(58) Field of Classification Search
CPC ... H04L 5/0053; H04L 5/0007; H04L 1/1822; H04L 5/0044; H04L 2001/0092; H04L 1/1825; H04L 1/1671; H04L 5/0055; H04B 7/024
See application file for complete search history.

(56) References Cited

U.S. PATENT DOCUMENTS

| | | | |
|---|---|---|---|
| 2017/0215183 A1 | 7/2017 | Gulati et al. | |
| 2017/0347394 A1 | 11/2017 | Yasukawa et al. | |
| 2019/0075589 A1 | 3/2019 | Jeon et al. | |
| 2021/0243841 A1* | 8/2021 | Yasukawa | H04W 28/04 |
| 2022/0376837 A1* | 11/2022 | Sun | H04L 1/1864 |

FOREIGN PATENT DOCUMENTS

| | | |
|---|---|---|
| CN | 108347313 A | 7/2018 |
| CN | 109792721 A | 5/2019 |
| WO | WO 2016/131344 A1 | 8/2016 |
| WO | WO 2018/123950 A1 | 7/2018 |

OTHER PUBLICATIONS

Second Office Action in Chinese Patent Application No. 202111346104.4, issued by the CNIPA on Mar. 11, 2023.
Notice of Reasons for Refusal in Japanese Patent Application No. 2021-576527, issued by the JPO on Apr. 21, 2023.
Lenovo, Motorola Mobility, Discussion on resource allocation for NR sidelink Mode 1, R1-1906268, 3GPP TSG RAN WG1 #97, Reno, USA, May 3, 2019.
Examination Report of EP Application No. 19935148.7, dated Oct. 20, 2022.
First Office Action in Republic of China Patent Application No. 2021113461044, issued on Jan. 5, 2023.
Examination Report of EP Application No. 19935148.7, dated Jun. 22, 2023.
International Search Report of PCT/CN2019/093893, mailed from China National Intellectual Property Administration on Mar. 25, 2020.
Vodafone, "New SID: Study on NR V2X," RP-181429, 3GPP TSG RAN Meeting #80, La Jolla, U.S.A., Jun. 11-14, 2018.
Extended European Search Report of European Patent Application No. 19935148.7, dated Apr. 14, 2022.
First Office Action in Indian Patent Application No. 202117054477, issued on May 23, 2022.
Lenovo, Motorola Mobility, titled "SL HARQ operation," 3GPP TSG RAN WG2 Meeting #106, R2-1906733, Reno, USA, May 13-17, 2019.
Communication pursuant to Article 94(3) EPC for European application 19935148.7 mailed Jan. 26, 2024.
Communication pursuant to Article 94(3) EPC for European Application No. 19935148.7 mailed on Jun. 28, 2024.

* cited by examiner

200

A terminal device determines a target resource and a target data from at least one sidelink transmission resource and at least one data, wherein an HARQ feedback mode of the target data is matched with the target resource — S210

The terminal device sends the target data on the target resource — S220

300

S310 — A terminal device determines a transmission mode of a target data, the transmission mode including a new transmission or a retransmission, and the target data being a sidelink data

S410 — A terminal device receives second indication information from a network device S420 — The terminal device determines a target address corresponding to a target resource according to the second indication information, the target resource being a sidelink resource, and the target resource being used for a new transmission

S510 — A terminal device determines a multi-antenna transmission resource, the multi-antenna transmission resource being a sidelink transmission resource S520 — The terminal device receives at least one piece of feedback information through the multi-antenna transmission resource

S610 — A terminal device receives a target data through a target resource, wherein the target resource is a sidelink transmission resource, the target data is a multicast data, and an HARQ feedback mode of the target data is matched with the target resource S620 — The terminal device performs feedback processing according to the HARQ feedback mode

| S710: A terminal device sends at least one piece of feedback information of a target data through a multi-antenna transmission resource, the target data being a sidelink data |

| S810: A network device receives multicast member information from a terminal device |

| S820: The network device sends configuration information to the terminal device, the configuration information being used for configuring an HARQ feedback mode of at least one sidelink data corresponding to the multicast member information |

| S910: A network device sends transmission mode indication information to a terminal device, the transmission mode indication information being used for indicating a transmission mode of a sidelink data when the terminal device receives an acknowledgement (ACK) |

FIG. 9

1000
| A network device sends second indication information to a terminal device, the second indication information being used for the terminal device to determine a target address corresponding to a target resource, the target resource being a sidelink transmission resource, and the target resource being used for a new transmission | — S1010 |
FIG. 10
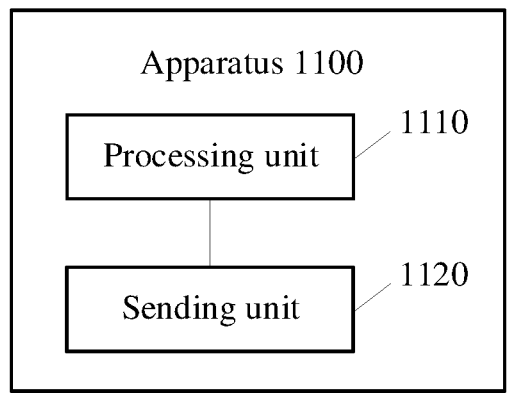
FIG. 11
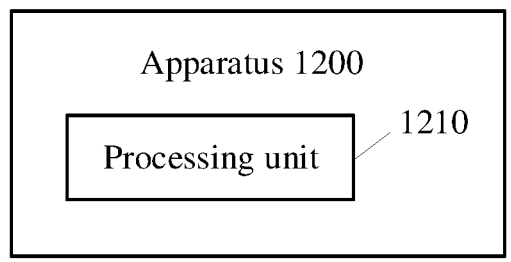
FIG. 12

SIDELINK TRANSMISSION METHOD AND SIDELINK TRANSMISSION APPARATUS

CROSS-REFERENCE TO RELATED APPLICATION

The present application is a continuation application of International Application No. PCT/CN2019/093893, filed on Jun. 28, 2019, the entire content of which is hereby incorporated by reference.

TECHNICAL FIELD

The present application relates to the field of communication, and specifically, to a method for sidelink transmission, and an apparatus for sidelink transmission.

BACKGROUND

A 5th generation (5G) communication system supports vehicle to everything (V2X) communication. The V2X communication is a sidelink transmission technology, in which one terminal device may directly communicate with another terminal device without forwarding through a network device, so it has higher spectrum efficiency and lower transmission delay.

Similar to an uplink and a downlink, there is also a possibility of a transmission failure in data transmission in a sidelink. Therefore, a sender needs to determine whether the data is successfully transmitted, so as to determine whether to retransmit the data later. However, how the sender determines a reception situation of the data in the sidelink is one unsolved problem.

SUMMARY

The present application provides a method for sidelink transmission, and an apparatus for sidelink transmission, which may be applied to a sidelink transmission based on hybrid automatic repeat request (HARQ) feedback.

In a first aspect, a method for transmitting sidelink data is provided, including: determining, by a terminal device, a target resource and a target data from at least one sidelink transmission resource and at least one data, wherein an HARQ feedback mode of the target data is matched with the target resource; and sending, by the terminal device, the target data on the target resource.

As an optional embodiment, before the terminal device sends the target data, a transmission mode of the target data is determined, wherein the transmission mode includes a new transmission or a retransmission.

As an optional embodiment, before the terminal device sends the target data, the terminal device receives second indication information from a network device; and the terminal device determines a target address corresponding to a target resource according to the second indication information, wherein the target resource is a sidelink transmission resource, and the target resource is used for a new transmission.

As an optional embodiment, the method further includes: determining, by the terminal device, a multi-antenna transmission resource, wherein the multi-antenna transmission resource is a sidelink transmission resource; and receiving, by the terminal device, at least one piece of feedback information of a target data through the multi-antenna transmission resource.

In a second aspect, a method for transmitting sidelink data is provided, including: determining, by a terminal device, a transmission mode of a target data, wherein the transmission mode includes a new transmission or a retransmission, and the target data is a sidelink data.

As an optional embodiment, the terminal device determines a target resource and a target data from at least one sidelink transmission resource and at least one data, wherein an HARQ feedback mode of the target data is matched with the target resource; and the terminal device sends the target data on the target resource.

As an optional embodiment, before the terminal device sends the target data, the terminal device receives second indication information from a network device; and the terminal device determines a target address corresponding to a target resource according to the second indication information, wherein the target resource is a sidelink transmission resource, and the target resource is used for a new transmission.

As an optional embodiment, the method further includes: determining, by the terminal device, a multi-antenna transmission resource, wherein the multi-antenna transmission resource is a sidelink transmission resource; and receiving, by the terminal device, at least one piece of feedback information of a target data through the multi-antenna transmission resource.

In a third aspect, a method for determining a transmission address of a sidelink is provided, including: receiving, by a terminal device, second indication information from a network device; and determining, by the terminal device, a target address corresponding to a target resource according to the second indication information, wherein the target resource is a sidelink transmission resource, and the target resource is used for a new transmission.

As an optional embodiment, the terminal device determines a target resource and a target data from at least one sidelink transmission resource and at least one data, wherein an HARQ feedback mode of the target data is matched with the target resource; and the terminal device sends the target data on the target resource.

As an optional embodiment, before the terminal device sends the target data, a transmission mode of the target data is determined, wherein the transmission mode includes a new transmission or a retransmission.

As an optional embodiment, the method further includes: determining, by the terminal device, a multi-antenna transmission resource, wherein the multi-antenna transmission resource is a sidelink transmission resource; and receiving, by the terminal device, at least one piece of feedback information of a target data through the multi-antenna transmission resource.

In a fourth aspect, a method for receiving feedback information of sidelink data is provided, including: determining, by a terminal device, a multi-antenna transmission resource, wherein the multi-antenna transmission resource is a sidelink transmission resource; and receiving, by the terminal device, at least one piece of feedback information through the multi-antenna transmission resource.

As an optional embodiment, before the terminal device receives at least one piece of feedback information through the multi-antenna transmission resource, the terminal device determines a target resource and a target data from at least one sidelink transmission resource and at least one data, wherein an HARQ feedback mode of the target data is matched with the target resource; and the terminal device sends the target data on the target resource.

As an optional embodiment, before the terminal device sends the target data, a transmission mode of the target data is determined, wherein the transmission mode includes a new transmission or a retransmission.

As an optional embodiment, before the terminal device sends the target data, the terminal device receives second indication information from a network device; and the terminal device determines a target address corresponding to a target resource according to the second indication information, wherein the target resource is a sidelink transmission resource, and the target resource is used for a new transmission.

In a fifth aspect, a feedback method for sidelink data is provided, including: receiving, by a terminal device, a target data through a target resource, wherein the target resource is a sidelink transmission resource, the target data is a multicast data, and an HARQ feedback mode of the target data is matched with the target resource; and performing, by the terminal device, feedback processing according to the HARQ feedback mode.

As an optional embodiment, the terminal device sends at least one piece of feedback information of the target data through a multi-antenna transmission resource, wherein the target data is a sidelink data.

In a sixth aspect, a feedback method for sidelink data is provided, including: sending, by a terminal device, at least one piece of feedback information of a target data through a multi-antenna transmission resource, wherein the target data is a sidelink data.

As an optional embodiment, before the terminal device sends at least one piece of feedback information of the target data through a multi-antenna transmission resource, the terminal device receives the target data through a target resource, wherein the target resource is a sidelink transmission resource, the target data is a multicast data, and an HARQ feedback mode of the target data is matched with the target resource; and the terminal device performs feedback processing according to the HARQ feedback mode.

In a seventh aspect, a method for transmitting sidelink data is provided, including: receiving, by a network device, multicast member information from a terminal device; and sending, by the network device, configuration information to the terminal device, wherein the configuration information is used for configuring an HARQ feedback mode of at least one sidelink data corresponding to the multicast member information.

As an optional embodiment, the method further includes: sending, by the network device, transmission mode indication information to the terminal device, where the transmission mode indication information is used for indicating a transmission mode of the sidelink data when the terminal device receives an acknowledge (ACK).

As an optional embodiment, the method further includes: sending, by the network device, second indication information to the terminal device, wherein the second indication information is used for the terminal device to determine a target address corresponding to a target resource, the target resource is a sidelink transmission resource, and the target resource is used for a new transmission.

In an eighth aspect, a method for transmitting sidelink data is provided, further including: sending, by a network device, transmission mode indication information to a terminal device, wherein the transmission mode indication information is used for indicating a transmission mode of a sidelink data when the terminal device receives an acknowledge (ACK).

As an optional embodiment, the method also includes: receiving, by the network device, multicast member information from the terminal device; and sending, by the network device, configuration information to the terminal device, wherein the configuration information is used for configuring an HARQ feedback mode of at least one sidelink data corresponding to the multicast member information.

As an optional embodiment, the method further includes: sending, by the network device, second indication information to the terminal device, wherein the second indication information is used for the terminal device to determine a target address corresponding to a target resource, the target resource is a sidelink transmission resource, and the target resource is used for a new transmission.

In a ninth aspect, a method for determining a transmission address of a sidelink is provided, including: sending, by a network device, second indication information to a terminal device, wherein the second indication information is used for the terminal device to determine a target address corresponding to a target resource, the target resource is a sidelink transmission resource, and the target resource is used for a new transmission.

As an optional embodiment, the method also includes: receiving, by the network device, multicast member information from the terminal device; and sending, by the network device, configuration information to the terminal device, wherein the configuration information is used for configuring an HARQ feedback mode of at least one sidelink data corresponding to the multicast member information.

As an optional embodiment, the method further includes: sending, by the network device, transmission mode indication information to the terminal device, wherein the transmission mode indication information is used for indicating a transmission mode of the sidelink data when the terminal device receives an acknowledge (ACK).

In a tenth aspect, an apparatus for sidelink transmission is provided, configured to perform the method in any one of the first to sixth aspects described above.

Specifically, the apparatus includes function modules configured to perform the method in any one of the first to sixth aspects described above.

In an eleventh aspect, an apparatus for sidelink transmission is provided, configured to perform the method in any one of the seventh to ninth aspects described above.

Specifically, the apparatus includes function modules configured to perform the method in any one of the seventh to ninth aspects described above.

In a twelfth aspect, a device for sidelink transmission is provided, including a processor and a memory. The memory is configured to store a computer program, and the processor is configured to call and run the computer program stored in the memory to execute the method in any one of the first to sixth aspects described above.

In a thirteenth aspect, a device for sidelink transmission is provided, including a processor and a memory. The memory is configured to store a computer program, and the processor is configured to call and run the computer program stored in the memory to execute the method in any one of the seventh to ninth aspects described above.

In a fourteenth aspect, a chip is provided, configured to execute the method in any one of the first to sixth aspects described above. Specifically, the chip includes: a processor, configured to call and run a computer program from a memory, so that a device having the chip installed is configured to perform the method in any one of the first to sixth aspects described above.

In a fifteenth aspect, a chip is provided, configured to perform the method in any one of the seventh to ninth aspects described above. Specifically, the chip includes: a processor, configured to call and run a computer program from a memory, so that a device having the chip installed is configured to perform the method in any one of the seventh to ninth aspects described above.

In a sixteenth aspect, a computer-readable storage medium is provided, configured to store a computer program, wherein the computer program enables a computer to perform the method in any one of the first to sixth aspects described above.

In a seventeenth aspect, a computer-readable storage medium is provided, configured to store a computer program, wherein the computer program enables a computer to perform the method in any one of the seventh to ninth aspects described above.

In an eighteenth aspect, a computer program product is provided, including a computer program instruction, wherein the computer program instructions enable a computer to perform the method in any one of the first to sixth aspects described above.

In a nineteenth aspect, a computer program product is provided, including a computer program instruction, wherein the computer program instructions enable a computer to perform the method in any one of the seventh to ninth aspects described above.

In a twentieth aspect, a computer program is provided, when run on a computer, enabling the computer to perform the method in any one of the first to sixth aspects described above.

In a twenty-first aspect, a computer program is provided, when run on a computer, enabling the computer to perform the method in any one of the seventh to ninth aspects described above.

BRIEF DESCRIPTION OF DRAWINGS

FIG. 3 is a schematic diagram of a method for determining a transmission mode of a sidelink according to the present application.

FIG. 4 is a schematic diagram of a method for determining a transmission address of a sidelink according to the present application.

FIG. 5 is a schematic diagram of a method for receiving feedback information of a sidelink according to the present application.

FIG. 6 is a schematic diagram of a feedback method for sidelink data according to the present application.

FIG. 7 is a schematic diagram of a method for sidelink transmission according to the present application.

FIG. 8 is a schematic diagram of another method for sidelink transmission according to the present application.

FIG. 9 is a schematic diagram of another method for sidelink transmission according to the present application.

FIG. 10 is a schematic diagram of another method for sidelink transmission according to the present application.

FIG. 11 is a schematic structural diagram of an apparatus for sidelink transmission according to the present application.

FIG. 12 is a schematic structural diagram of another apparatus for sidelink transmission according to the present application.

DETAILED DESCRIPTION

Technical solutions in embodiments of the present application will be described below with reference to the drawings in the embodiments of the present application. It is apparent that the embodiments described are just some of the embodiments of the present application, but not all of the embodiments of the present application. According to the embodiments of the present application, all other embodiments achieved by a person of ordinary skill in the art without making inventive efforts are within the protection scope of the present application.

Figures 1, 2:
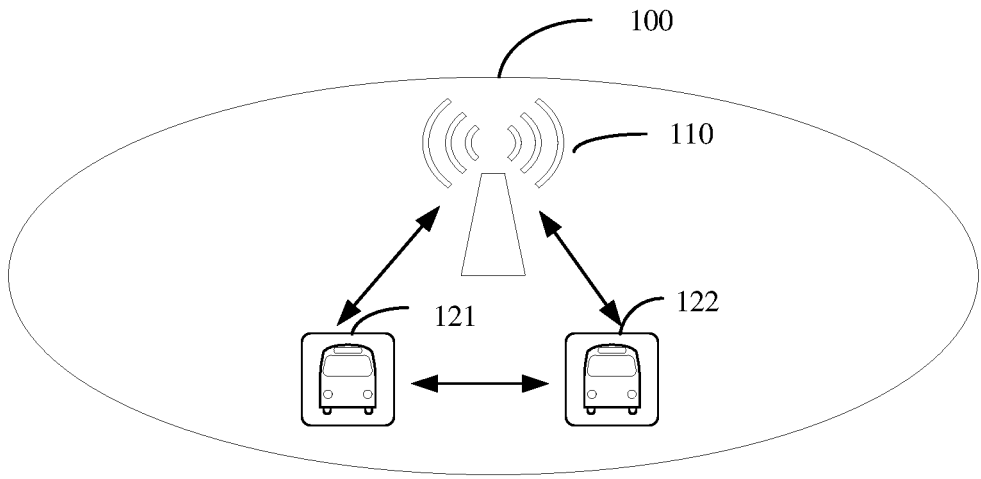
FIG. 1 is a schematic diagram of a V2X communication system.
FIG. 2 is a schematic diagram of a method for sending sidelink data according to the present application.

FIG. 1 shows a schematic diagram of a communication system 100 applicable to the present application.

The system 100 includes a network device 110, a terminal device 121, and a terminal device 122. The terminal device 121 and the terminal device 122 may be vehicles with the communication function, vehicle-mounted electronic systems, mobile phones, wearable electronic devices, or other communication devices that performs a V2X protocol.

The network device 110 may be an evolutional node B (eNB) in an LTE system, or a base station (gNB) in a 5G communication system. The above network device is only an illustration, and the network device 110 may also be a relay station, an access point, a vehicle-mounted device, a wearable device, or another type of device.

Before data is transmitted through a sidelink, the terminal device 121 and the network device 110 may determine a resource used for transmitting the data through signaling interaction, and then the terminal device 121 communicates with the terminal device 122 by using the determined resource. Or, the terminal device 121 may determine a sidelink transmission resource in a way other than an indication of the network device.

The above two examples are two transmission modes of sidelink communication, namely a centralized scheduling transmission mode (also called Mode3) and a distributed transmission mode (also called Mode4). Below, the two transmission modes will be briefly introduced.

The centralized scheduling transmission mode: In this mode, before sending data every time, the terminal device needs to apply for a resource from a network device, and send V2X service data according to the resource allocated by the network device. Since resources of the terminal device are uniformly allocated by the network device, a case in which the same resource is allocated to adjacent terminal devices will not occur, thus, the centralized transmission mode can ensure better transmission reliability. However, since a signaling needs to be interacted between the terminal device and the network device every time, comparatively speaking, compared with the distributed transmission mode, transmission delay of sending a data by using the centralized scheduling transmission mode is longer.

The distributed transmission mode: In this mode, in a scenario with network coverage, when the network device configures, through a system information block (SIB) or a radio resource control (RRC) signaling, a resource pool for the terminal device to send V2X data, the data may be sent through at least part of resources acquired autonomously from the resource pool by randomly selecting, based on a monitoring reservation mechanism, or based on a partial monitoring reservation mechanism. In this mode, in a scenario without the network coverage, the terminal device sends the data on at least part of resources acquired autonomously from the resource pool in pre-configuration information. The pre-configuration information may be a resource pool configured inside a terminal when the terminal leaves the factory, or may be information pre-configured by the network device, and stored by the terminal at its interior. Since the terminal device chooses resources autonomously, a case in which different terminal devices choose the same resource to send the data might appear, so a transmission collision may occur.

No matter whether the terminal device uses the centralized scheduling transmission mode or the distributed transmission mode to send the data on the sidelink, there is a possibility of a transmission failure. Therefore, a sender needs to determine whether the data is successfully transmitted, in order to determine whether to retransmit the data later.

A method for transmitting the data on the sidelink according to the present application will be explained in detail below.

FIG. 2 is a method for sending sidelink data according to the present application, and the method 200 may be performed by the terminal device in the system 100. The method 200 includes S210.

In the S210, the terminal device determines a target resource and a target data from at least one sidelink transmission resource and at least one data, wherein an HARQ feedback mode of the target data is matched with the target resource.

The HARQ feedback mode of the target data being matched with the target resource described above includes: the HARQ feedback mode of the target data is the same as that of the target resource.

In the present application, the HARQ feedback mode may be the following two modes.

In HARQ feedback mode 1, a receiver only transmits an HARQ process negative acknowledge (NACK) (Receiver UE transmits only HARQ NACK).

The receiver only sends feedback information when it fails in reception, and does not send feedback information when it succeeds in reception. Accordingly, if the sender receives the NACK, it is determined that the previously sent data fails to be received. If the sender does not receive the NACK, it is determined that the previously sent data is successfully received.

In HARQ feedbACK mode 2, the receiver transmits an HARQ process acknowledge (ACK) or the NACK (Receiver UE transmits HARQ ACK/NACK).

The receiver which applies the mode 2 needs to send feedback information, no matter whether it succeeds or fails in reception. If the receiver succeeds in reception, the ACK is sent; and if the receiver fails in reception, the NACK is sent. Accordingly, if the sender receives the ACK, it is determined that the previously sent data is successfully received; and if the sender receives the NACK, it is determined that the previously sent data fails to be received.

The above two HARQ feedback modes are only illustrations, and other HARQ feedback modes (including HARQ feedback mode defined in a future communication protocol) are also applicable to the method 200.

The target resource is one of the at least one sidelink transmission resource, and the target data is one of the at least one data. The HARQ feedback modes corresponding to different sidelink transmission resources may be different, and the HARQ feedback modes corresponding to different data may also be different. Before determining the target data and the target resource, the terminal device needs to determine an HARQ feedback mode of the at least one sidelink transmission resource and an HARQ feedback mode of the at least one data. After that, the terminal device determines, from the at least one sidelink transmission resource and the at least one data, a resource and a data with a same HARQ feedback mode, that is, the target resource and the target data.

Herein, the terminal device may determine the data matched with the HARQ feedback mode of the sidelink transmission resource from the at least one data, according to the HARQ feedback mode of the sidelink transmission resource, or may determine the sidelink transmission resource matched with the HARQ feedback mode of the data from the at least one sidelink transmission resource, according to the HARQ feedback mode of the data. The present application does not limit a specific mode in which the terminal device determines the target resource and the target data.

As an optional embodiment, the terminal device may determine (or "configure") the HARQ feedback mode of the above at least one data according to at least one of the following three relationships.

A first relationship is a corresponding relationship between multicast member information corresponding to the at least one data and the HARQ feedback mode.

For example, the above at least one data is a multicast data, and if the terminal device can determine a quantity of multicast members corresponding to the multicast data, the terminal device may configure the HARQ feedback mode 2 for the multicast data; and if the terminal device cannot determine the quantity of the multicast members corresponding to the multicast data, the terminal device may configure the HARQ feedback mode 1 for the multicast data.

In a case in which the quantity of the multicast members is determined, the terminal device can clearly determine, based on the HARQ feedback mode 2, a situation for each multicast member to receive the multicast data. If the terminal device does not receive the ACK or the NACK of one multicast member, the terminal device may determine that the multicast member fails in reception, and the multicast data may be retransmitted, thus improving a success rate of data transmission.

In a case in which the quantity of the multicast members is uncertain, based on the HARQ feedback mode 1, the terminal device only needs to retransmit the multicast data according to feedback information sent by the multicast member which fails in reception, and does not need to receive the feedback information sent by each multicast member, thus reducing overhead of the terminal device. This solution is especially suitable for a scenario with a relatively large quantity of multicast members.

A second relationship is a corresponding relationship between an attribute of a bearer or logical channel corresponding to the at least one data and the HARQ feedback mode.

The above attribute is, for example, a priority. The terminal device may determine the HARQ feedback mode of the at least one data according to priorities of different bearers. If the priority of the bearer corresponding to the at least one data is relatively high, the terminal device may determine that the HARQ feedback mode of the at least one data is the HARQ feedback mode 2, so as to accurately determine a reception situation of the data on the bearer. If the priority of the bearer corresponding to the at least one data is relatively low, the terminal device may determine that the HARQ feedback mode of the at least one data is the HARQ feedback mode 1, so as to reduce resource consumption caused by the feedback information.

A third relationship is a corresponding relationship between a channel quality measurement value corresponding to the at least one sidelink transmission resource and the HARQ feedback mode.

The above channel quality measurement value is, for example, a channel busy ratio (CBR) measurement value. If the CBR measurement value is relatively low, it is indicated that there are more available resources, the terminal device may configure the HARQ feedback mode 2 for the at least one data, so as to accurately determine the reception situation of the at least one data. If the CBR measurement value is relatively high, it is indicated that the available resources are less, the terminal device may configure the HARQ feedback mode 1 for the at least one data, so as to reduce feedback overhead.

The above three corresponding relationships may be information in a communication protocol, information sent by the network device to the terminal device through configuration information, or preconfigured information.

For example, after the terminal device acquires upper layer information, it sends the upper layer information to the network device. Thereafter, if the terminal device is in a connected state, the network device may send the above corresponding relationship to the terminal device through an RRC message; and if the terminal device is in an idle state or an inactive state, the network device may send it to the terminal device through a system message (for example, SIB).

The above upper layer information may be at least one piece of the following information: whether the quantity of the multicast members may be determined in a multicast scenario; in the multicast scenario the quantity of the multicast members when the quantity of the multicast members may be determined; quality of service (QoS) requirement in the multicast scenario.

If the terminal device is outside the coverage of the network device, the terminal device may determine an HARQ feedback mode of the at least one data according to the pre-configured information.

The network device may directly indicate the HARQ feedback mode of the at least one data, besides indicating the HARQ feedback mode of the at least one data through the corresponding relationship. For example, the network device may send downlink control information (DCI) or the RRC message to the terminal device to indicate the HARQ feedback mode of the at least one data.

After determining the HARQ feedback mode of the target data, the terminal device may indicate the HARQ feedback mode of the target data to the receiver of the target data through first indication information. The first indication information is, for example, one field in sidelink control information (SCI). Or, after determining the HARQ feedback mode of the target data, the terminal device may send the first indication information to the network device, and the network device sends the first indication information to the receiver of the target data.

As an optional embodiment, the terminal device may determine the HARQ feedback mode of the at least one sidelink transmission resource according to one of the following three modes.

In a first mode, the terminal device determines the HARQ feedback mode of the at least one sidelink transmission resource according to the indication of the network device. For example, the network device may send the RRC message or the DCI to the terminal device, to indicate the HARQ feedback mode of the at least one sidelink transmission resource.

In a second mode, the terminal device determines the HARQ feedback mode of the at least one sidelink transmission resource according to resource pool configuration information. The resource pool configuration information may be information received by the terminal device from the network device.

In a third mode, the terminal device determines the HARQ feedback mode of the at least one sidelink transmission resource according to access layer information.

For example, the above access layer information is, for example, the CBR measurement value. If the CBR measurement value is relatively low, it is indicated that there are more available resources, the terminal device may configure the HARQ feedback mode 2 for the at least one sidelink transmission resource, so as to accurately determine the receiving situation of the target data; and if the CBR measurement value is relatively high, it is indicated that the available resources are less, the terminal device may configure the HARQ feedback mode 1 for the at least one sidelink transmission resource, so as to reduce the feedback overhead.

After determining the HARQ feedback modes of the at least one sidelink transmission resource and the at least one data, the terminal device may determine the target data and target resource of which the HARQ modes are matched from the at least one sidelink transmission resource and the at least one data. Subsequently, the terminal device may perform the following act.

In the S220, the terminal device sends the target data on the target resource.

Through the above method, the terminal device can determine the reception situation of the sidelink data based on the different HARQ feedback modes, improving flexibility of sidelink feedback.

In sidelink transmission, the sender also needs to determine a transmission mode of the data. FIG. 3 shows a method for determining a transmission mode of a sidelink according to the present application. The method 300 may be performed by the terminal device in the system 100. The method 300 includes S310.

In the S310, the terminal device determines a transmission mode of a target data, wherein the transmission mode includes a new transmission or a retransmission, and the target data is a sidelink data.

The transmission mode of the target data may be determined in the following modes.

As an optional embodiment, the terminal device may receive a new data indication (NDI) from a network device, wherein the NDI is, for example, one bit, there are two states of "0" and "1" for the bit, and the bit changes from "0" to "1", or the bit changes from "1" to "0", that is, the NDI is reversed. The terminal device may determine the transmission mode of the target data, according to a case in which whether the NDIs received at two adjacent times are reversed.

For example, if the state of the NDI received by the terminal device at a first time is "0", and the state of the NDI received at a second time is "1", the terminal device may determine that the transmission mode of the target data is the new transmission, according to reversing of the NDI; and if the state of the NDI received by the terminal device at the first time is "0", and the state of the NDI received at the second time is "0", the terminal device may determine that the transmission mode of the target data is the retransmission, according to not reversing of the NDI.

As another optional embodiment, the terminal device may determine the transmission mode of the target data according to an ACK and the NDI.

For example, when the terminal device receives the ACK (feedback information of a data sent before the terminal device sends the target data), even when the NDI is not reversed, then the terminal device may not send the target data any more, or the terminal device may determine whether the transmission mode of the target data is the retransmission according to an indication of the network device.

For another example, when the terminal device receives the ACK (the feedback information of the data sent before the terminal device sends the target data), even when the NDI is not reversed, the terminal device may determine that the transmission mode of the target data is the new transmission, or the terminal device may determine whether the transmission mode of the target data is the new transmission according to the indication of the network device.

If the terminal device determines that the transmission mode of the target data is the retransmission, the terminal device may select an original HARQ process number for the target data. For example, the HARQ process number used by the data sent before the terminal device sends the target data is A, then the terminal device may determine that the HARQ process number used for retransmitting the target data is B, wherein A is the same as B.

If the terminal device determines that the transmission mode of the target data is the new transmission, the terminal device may select a new HARQ process number, or use the original HARQ process number for the target data. For example, the HARQ process number used by the data sent before the terminal device sends the target data is A, then the terminal device may determine that the HARQ process number used by a newly transmitted target data is C, wherein A and C may be same or different. In addition, C and B may be same or different, wherein B is the process number used for retransmitting the data.

The above HARQ process number may be a process number corresponding to the target resource configured by the network device, wherein the target resource is a sidelink transmission resource bearing the target data.

The above HARQ process number may also be a process number determined by the terminal device itself. For example, the terminal device determines a maximum quantity of retransmissions according to a CBR measurement value and/or a configuration of the network device. When the terminal device sends the target data, a quantity of transmissions of the sidelink data has reached the maximum quantity of retransmissions, and the terminal device may determine that a transmission mode of the target data is the new transmission. When the terminal device sends the target data, and the quantity of transmissions of the sidelink data has not reached the maximum quantity of retransmissions, the terminal device may determine that the transmission mode of the target data is the retransmission.

In a V2X communication scenario of LTE, the retransmission and the new transmission of the data are not performed based on the feedback information, and the new transmission and the retransmission of one data are both performed on the same sidelink transmission resource. In the solution provided in the present application, the retransmission and the new transmission of the data are performed based on the feedback information, and the retransmission and the new transmission of one data may not be performed on the same sidelink transmission resource. Therefore, the above-mentioned sidelink transmission solution based on an HARQ process can avoid transmission failure which may be caused when the retransmission and the new transmission of one data may not be performed on the same sidelink transmission resource.

As another optional embodiment, the terminal device may determine the transmission mode of the target data according to whether there is a change of a quantity of bits that are capable of being transmitted by the sidelink transmission resource.

For example, when a quantity of bits of a transport block(s) that the target resource is capable of transmitting present time changes compared with a quantity of bits of a transport block(s) that the target resource is capable of transmitting last time, it is indicated that the target resource is no longer suitable for the data transmitted last time, and the terminal device may determine that the transmission mode of the target data is the new transmission; and when the quantity of the bits of the transport block(s) that the target resource is capable of transmitting present time does not change compared with the quantity of the bits of the transport block(s) that the target resource is capable of transmitting last time, it is indicated that the target resource is still suitable for the data transmitted last time, and the terminal device may determine that the transmission mode of the target data is the retransmission (i.e., the target data is retransmission data of the data transmitted last time).

After the terminal device determines the transmission mode of the target data, if it is determined to retransmit or newly transmit the target data, the terminal device may send the target data on the target resource, wherein the target resource is the sidelink transmission resource.

The target resource may be configured by the network device, or determined by the terminal device itself. For example, the terminal device may determine the target resource from the resource pool.

If the terminal device selects the new transmission, the terminal device may select a target address for the target resource (when the network device does not specify the target address), wherein the target address may be a multicast address, a unicast address, or a broadcast address. The terminal device may also select a logical channel or bearer for the target resource.

In a V2X communication scenario of the LTE, after the terminal device obtains a grant of one sidelink transmission resource, it starts performing the new transmission and the retransmission on the sidelink transmission resource regardless of feedback of the sidelink data. And in the method 300, the terminal device first determines the transmission mode of the target data, and then retransmits the target data when the target data needs to be retransmitted, thereby reducing resource overhead. In addition, and since one sidelink transmission resource may only be used for the retransmission or the new transmission, the method 300 may improve matching degree between a resource characteristic and the transmission mode.

In the sidelink transmission, the sender also needs to determine a transmission address of the data (for example, the above-mentioned target address). FIG. 4 shows a method for determining a transmission address of a sidelink according to the present application. The method 400 may be performed by the terminal device in the system 100. The method 400 includes S410 and S420.

In the S410, the terminal device receives second indication information from a network device.

In the S420, the terminal device determines a target address corresponding to a target resource according to the second indication information, wherein the target resource is a sidelink transmission resource, and the target resource is used for a new transmission.

The second indication information may be an identifier of the target address.

For example, the terminal device sends an address list including at least one transmission address to the network device through sidelink UE information, and the network device determines one transmission address as the target address from the address list, and sends a number of the target address in the address list (i.e., the identifier of the target address) to the terminal device through the second indication information. The terminal device may determine the target address after receiving the second indication information.

The second indication information may also be a transmission mode corresponding to the target resource.

For example, the terminal device saves multiple transmission addresses corresponding to at least one transmission mode of unicast, multicast, or broadcast, the network device may indicate the transmission mode of the target resource through the second indication information, and the terminal device determines the transmission mode of the target resource after receiving the second indication information. Then, the terminal device may determine the target address from at least one transmission address corresponding to the transmission mode of the target resource.

In the V2X communication scenario of the LTE, which sidelink transmission resource is used by the terminal device to send data is determined by the terminal device itself, and the sidelink transmission resource will inevitably bear a newly transmitted data and a retransmitted data with a same transmission address. And in the solution provided in the present application, whether the terminal device retransmits on the sidelink transmission resource is determined based on HARQ feedback, and the terminal device may not need to continue sending the retransmitted data after sending the newly transmitted data on one sidelink transmission resource. In this case, the network device indicates the transmission address of the new data to the terminal device, which can avoid waste of the sidelink transmission resource.

In the sidelink transmission, the sender also needs to determine a usage mode of a feedback resource. FIG. 5 shows a method for receiving feedback information of a sidelink according to the present application. The method 500 may be performed by the terminal device in the system 100. The method 500 includes S510.

In the S510, the terminal device determines a multi-antenna transmission resource, wherein the multi-antenna transmission resource is a sidelink transmission resource.

The multi-antenna transmission resource may be configured or indicated by the network device, for example, the network device may indicate a multi-antenna transmission scheme applicable to the terminal device through DCI or RRC, wherein the multi-antenna transmission scheme includes information of the multi-antenna transmission resource. The multi-antenna transmission resource may also be determined by the terminal device itself.

After determining the multi-antenna transmission scheme, the terminal device may send third indication information to the receiver through SCI, to indicate the receiver to use the multi-antenna transmission scheme for feedback. The above multi-antenna feedback scheme may also be sent to the receiver by the network device.

The above multi-antenna transmission resource may include a first feedback resource and a second feedback resource, wherein the first feedback resource includes at least one feedback resource, the second feedback resource includes at least one feedback resource, and each feedback resource described above may be used for transmitting an ACK or a NACK.

If the target data sent by the terminal device includes a first transport block and a second transport block, and the multi-antenna transmission resource includes a first feedback resource and a second feedback resource, the multi-antenna transmission scheme may include: the first feedback resource is used for transmitting feedback information of the first transport block, and the second feedback resource is used for transmitting feedback information of the second transport block.

Or, if the target data sent by the terminal device only includes the first transport block, and the multi-antenna transmission resource includes the first feedback resource and the second feedback resource, the multi-antenna transmission scheme may include: the first feedback resource and the second feedback resource are used for transmitting the feedback information of the first transport block.

Or, if the target data sent by the terminal device only includes the first transport block, and the multi-antenna transmission resource includes the first feedback resource and the second feedback resource, the multi-antenna transmission scheme may include: only the first feedback resource is used for transmitting the feedback information of the first transport block.

After the terminal device determines the multi-antenna feedback scheme, the following act S520 may be performed.

In the S520, the terminal device receives at least one piece of feedback information through the multi-antenna transmission resource.

Based on different transport blocks sent by the terminal device, at least one piece of feedback information may include the feedback information of the first transport block and the feedback information of the second transport block, or may include only the feedback information of the first transport block.

The above solution provides a flexible feedback scheme on the sidelink.

It should be noted that the methods 200 to 500 may be arbitrarily combined on a premise that the solutions do not conflict.

Below, a feedback method for sidelink data according to the present application will be introduced, wherein the method is applied to a receiver of a sidelink. As shown in FIG. 6, the method 600 includes S610 and S620.

In the S610, a terminal device receives a target data through a target resource, wherein the target resource is a sidelink transmission resource, the target data is a multicast data, and an HARQ feedback mode of the target data is matched with the target resource.

In the S620, the terminal device performs feedback processing according to the HARQ feedback mode.

That the terminal device performs feedback processing according to the HARQ feedback mode includes: the terminal device sends feedback information of the target data to a sender of a sidelink, or the terminal device does not send the feedback information of the target data according to the HARQ feedback mode 1.

Optionally, before the terminal device receives the target data through the target resource, the method further includes that: the terminal device receives first indication information or resource pool configuration information; and the terminal device determines the HARQ feedback mode according to the first indication information or the resource pool configuration information, wherein the first indication information is used for indicating the HARQ feedback mode corresponding to the target data, and the resource pool configuration information is used for configuring the HARQ feedback mode corresponding to the target resource.

Optionally, that the HARQ feedback mode of the target data is matched with the target resource includes: the HARQ feedback mode of the target data is the same as that of the target resource.

The method 600 is a method corresponding to the methods 200 to 500, and its implementation details and technical effects may be referred to the related descriptions in the methods 200 to 500, which will not be repeated here again.

When the terminal device sends the feedback information of the sidelink data, feedback may be performed according to the method shown in FIG. 7. As shown in FIG. 7, the method 700 includes S710.

In the S710, a terminal device sends at least one piece of feedback information of a target data through a multi-antenna transmission resource, wherein the target data is a sidelink data.

Optionally, the target data includes a first transport block and a second transport block, the at least one piece of feedback information includes feedback information of the first transport block and feedback information of the second transport block, and the multi-antenna transmission resource includes a first feedback resource and a second feedback resource, wherein the first feedback resource is used for transmitting the feedback information of the first transport block, and the second feedback resource is used for transmitting the feedback information of the second transport block.

Optionally, the target data includes the first transport block, the at least one piece of feedback information includes the feedback information of the first transport block, and the multi-antenna transmission resource includes the first feedback resource and the second feedback resource, wherein the first feedback resource and the second feedback resource are used for transmitting the feedback information of the first transport block.

Optionally, the target data includes the first transport block, the at least one piece of feedback information includes the feedback information of the first transport block, and the multi-antenna transmission resource includes the first feedback resource and the second feedback resource, wherein the first feedback resource is used for transmitting the feedback information of the first transport block.

Optionally, the method 700 further includes: the terminal device receives third indication information, wherein the third indication information is used for indicating a multi-antenna transmission scheme corresponding to the multi-antenna transmission resource, and the multi-antenna transmission resource is used for bearing the feedback information of the target data.

The method 700 is a method corresponding to the methods 200 to 500, and its implementation details and technical effects may be referred to the related descriptions in the methods 200 to 500, which will not be repeated here again.

The method 600 and the method 700 may be arbitrarily combined on a premise that the solutions do not conflict.

The present application also provides a method for sidelink transmission, which is applied to a network device corresponding to a sidelink. As shown in FIG. 8, the method 800 includes S810 and S820.

In the S810, a network device receives multicast member information from a terminal device.

In the S820, the network device sends configuration information to the terminal device, wherein the configuration information is used for configuring an HARQ feedback mode of at least one sidelink data corresponding to the multicast member information.

Optionally, the multicast member information includes at least one piece of the following information: whether a quantity of multicast members corresponding to the at least one sidelink data is determined; the quantity of the multicast members corresponding to the at least one sidelink data; or a QoS corresponding to the at least one sidelink data.

Optionally, the configuration information includes at least one of the following three relationships: a corresponding relationship between the multicast member information and the HARQ feedback mode; a corresponding relationship between an attribute of a bearer or logical channel corresponding to the at least one sidelink data and the HARQ feedback mode; or a corresponding relationship between a channel quality measurement value corresponding to at least one sidelink transmission resource and the HARQ feedback mode, wherein the at least one sidelink resource is used for transmitting the at least one sidelink data.

Optionally, the method 800 further includes: the network device indicates or configures the HARQ feedback mode of the at least one sidelink transmission resource, wherein the at least one sidelink transmission resource is used for transmitting the at least one sidelink data.

The method 800 is the method for the sidelink transmission described from a view of the network device, and its implementation details have been embodied in the methods 200 to 500. For specific implementation details and technical effects, please refer to the methods 200 to 500, and they will not be repeated here again.

The present application also provides a method for sidelink transmission, which is applied to a network device corresponding to a sidelink. As shown in FIG. 9, the method 900 includes S910.

In the S910, a network device sends transmission mode indication information to a terminal device, wherein the transmission mode indication information is used for indicating a transmission mode of a sidelink data when the terminal device receives an acknowledgement (ACK).

Optionally, the transmission mode includes stopping of transmission or a new transmission.

The method 900 is the method for the sidelink transmission described from a view of the network device, and its implementation details have been embodied in the methods 200 to 500. For specific implementation details and technical effects, please refer to the methods 200 to 500, and they will not be repeated here again.

The present application also provides a method for sidelink transmission, which is applied to a network device corresponding to a sidelink. As shown in FIG. 10, the method 1000 includes S1010.

In the S1010, a network device sends second indication information to a terminal device, wherein the second indication information is used for the terminal device to determine a target address corresponding to a target resource, the target resource is a sidelink transmission resource, and the target resource is used for a new transmission.

Optionally, the second indication information is a number of the target address, and the method 1000 further includes: the network device receives a number of at least one transmission address from the terminal device, wherein the at least one transmission address includes the target address.

Optionally, the second indication information is used for indicating a transmission mode of the target resource, and there is an association relationship between the transmission mode of the target resource and the target address.

The method 1000 is the method for the sidelink transmission described from a view of the network device, and its implementation details have been embodied in the methods 200 to 500. For specific implementation details and technical effects, please refer to the methods 200 to 500, and they will not be repeated here again.

It should be noted that the methods 800 to 1000 may be arbitrarily combined on a premise that the solutions do not conflict.

The examples of the method for the sidelink transmission according to the present application are described in detail above. It may be understood that in order to achieve the above functions, an apparatus for sidelink transmission includes corresponding hardware structures and/or software modules for performing the various functions. Those skilled in the art may easily understand that in connection with the units and algorithm acts of the examples described in the embodiments disclosed herein, the present application may be implemented in a form of hardware or a combination of the hardware and computer software. Whether a function is performed in a form of hardware or computer software driving hardware depends on a specific application and a design constraint condition of the technical solution. Skilled artisans may use different methods to implement the described functions for each particular application, but such an implementation should not be considered to be beyond the scope of the present application.

Division for functional units may be performed on the apparatus for the sidelink transmission according to the above method examples in the present application. For example, various functions may be divided into various functional units, or two or more functions may be integrated into one processing unit. The above integrated unit may be implemented in a form of hardware, or may be implemented in a form of software function unit. It should be noted that, the division of the units in the present application is illustrative, and is merely the division of logical functions. Other division modes may be used in actual implementations.

FIG. 11 is a schematic structural diagram of an apparatus for sidelink transmission according to the present application. The apparatus 1100 includes a processing unit 1110 and a sending unit 1120, wherein the processing unit 1110 is configured to control the sending unit 1120 to perform sending processing.

The processing unit 1110 is configured to determine a target resource and a target data from at least one sidelink transmission resource and at least one data, wherein an HARQ feedback mode of the target data is matched with the target resource; and the sending unit 1120 is configured to send the target data on the target resource.

Optionally, the HARQ feedback mode of the at least one data is determined by at least one of the following three relationships: a corresponding relationship between multicast member information corresponding to the at least one data and the HARQ feedback mode; a corresponding relationship between an attribute of a bearer or logical channel corresponding to the at least one data and the HARQ feedback mode; and a corresponding relationship between a channel quality measurement value corresponding to the at least one sidelink transmission resource and the HARQ feedback mode.

Optionally, the multicast member information is borne in upper layer information, and the multicast member information includes at least one piece of the following information: whether a quantity of multicast members corresponding to the at least one data is determined; the quantity of the multicast members corresponding the at least one data; or, quality of service (QoS) corresponding to the at least one data.

Optionally, the processing unit 1110 is further configured to configure an HARQ feedback mode corresponding to a transmission address according to the upper layer information, wherein the transmission address is a multicast address of the at least one data; or, configure, according to the upper layer information, an HARQ feedback mode corresponding to a bearer or logical channel of one transmission address, wherein the transmission address is the multicast address of the at least one data.

Optionally, the sending unit 1120 is further configured to send the multicast member information to a network device; and the apparatus further includes a receiving unit, configured to receive configuration information from the network device, wherein the configuration information includes at least one of the three relationships.

Optionally, the three relationships are included in pre-configuration information, or the three relationships are included in a communication protocol.

Optionally, an HARQ feedback mode of the at least one sidelink transmission resource is indicated by a network device; or, the HARQ feedback mode of the at least one sidelink transmission resource is configured by resource pool configuration information; or, the HARQ feedback mode of the at least one sidelink transmission resource is indicated by access layer information.

Optionally, the sending unit 1120 is further configured to send first indication information, wherein the first indication information is used for indicating the HARQ feedback mode corresponding to the target data.

Optionally, that the hybrid automatic repeat request (HARQ) feedback mode of the target data is matched with the target resource includes: the HARQ feedback mode of the target data is the same as that of the target resource.

FIG. 12 is a schematic structural diagram of another apparatus for sidelink transmission according to the present application. The apparatus 1200 includes a processing unit 1210. Herein, the processing unit is configured to determine a transmission mode of a target data, wherein the transmission mode includes a new transmission or a retransmission, and the target data is a sidelink data.

Optionally, the transmission mode of the target data is determined by a new data indication (NDI) corresponding to a target resource, wherein the target resource is a sidelink transmission resource bearing the target data.

Optionally, when the terminal device receives an acknowledgement (ACK), the transmission mode is stopping of retransmission, or, when the terminal device receives the acknowledgement (ACK), the transmission mode is the new transmission.

Optionally, the transmission mode is indicated by a network device.

Optionally, the target resource corresponds to a first HARQ process, when the NDI is not reversed, the transmission mode is the retransmission, and the target data corresponds to a second HARQ process; or, when the NDI is reversed, the transmission mode is the new transmission, and the target data corresponds to a third HARQ process.

Optionally, when a quantity of bits of a transport block(s) that the target resource is capable of transmitting present time changes compared with a quantity of bits of a transport block(s) that the target resource is capable of transmitting last time, the transmission mode is the new transmission.

Figure 13:
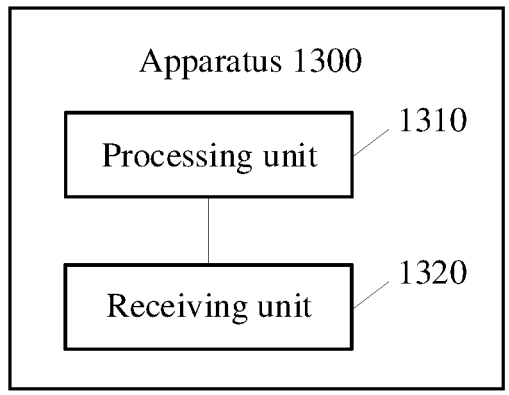
FIG. 13 is a schematic structural diagram of another apparatus for sidelink transmission according to the present application.

FIG. 13 is a schematic structural diagram of another apparatus for sidelink transmission according to the present application. The apparatus 1300 includes a processing unit 1310 and a receiving unit 1320, wherein the processing unit 1310 is configured to control the receiving unit 1320 to perform receiving processing. The receiving unit 1320 is configured to receive second indication information from a network device; and the processing unit 1310 is configured to determine a target address corresponding to a target resource according to the second indication information, wherein the target resource is a sidelink transmission resource, and the target resource is used for a new transmission.

Optionally, the second indication information is a number of the target address, and the apparatus 1300 further includes a sending unit, configured to send a number of at least one transmission address to the network device, wherein the at least one transmission address includes the target address.

Optionally, the second indication information is used for indicating a transmission mode of the target resource, and there is an association relationship between the transmission mode of the target resource and the target address.

Figure 14:
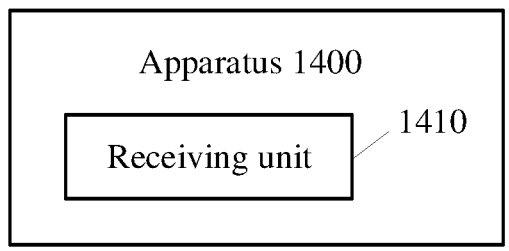
FIG. 14 is a schematic structural diagram of another apparatus for sidelink transmission according to the present application.

FIG. 14 is a schematic structural diagram of another apparatus for sidelink transmission according to the present application. The apparatus 1400 includes a receiving unit 1410, configured to receive at least one piece of feedback information through a multi-antenna transmission resource, wherein the multi-antenna transmission resource is a sidelink transmission resource.

Optionally, the apparatus 1400 further includes a sending unit, configured to send third indication information, wherein the third indication information is used for indicating a multi-antenna transmission scheme corresponding to the multi-antenna transmission resource.

Optionally, the at least one piece of feedback information includes feedback information of a first transport block and feedback information of a second transport block, and the multi-antenna transmission resource includes a first feedback resource and a second feedback resource, wherein the first feedback resource is used for transmitting the feedback information of the first transport block, and the second feedback resource is used for transmitting the feedback information of the second transport block.

Optionally, the at least one piece of feedback information includes the feedback information of the first transport block, and the multi-antenna transmission resource includes the first feedback resource and the second feedback resource, wherein the first feedback resource and the second feedback resource are used for transmitting the feedback information of the first transport block.

Optionally, the at least one piece of feedback information includes the feedback information of the first transport block, and the multi-antenna transmission resource includes the first feedback resource and the second feedback resource, wherein the first feedback resource is used for transmitting the feedback information of the first transport block.

Figure 15:
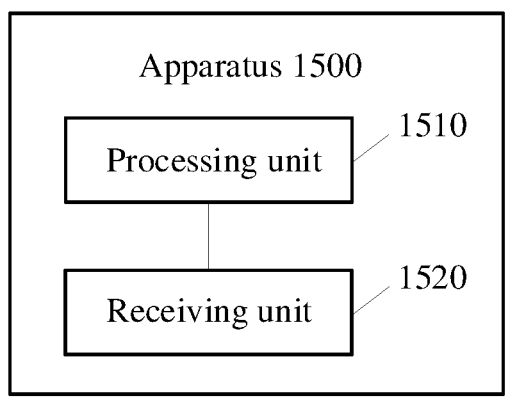
FIG. 15 is a schematic structural diagram of another apparatus for sidelink transmission according to the present application.

FIG. 15 is a schematic structural diagram of another apparatus for sidelink transmission according to the present application. The apparatus 1500 includes a processing unit 1510 and a receiving unit 1520, wherein the processing unit 1510 is configured to control the receiving unit 1520 to perform receiving processing.

The receiving unit 1520 is configured to receive a target data through a target resource, wherein the target resource is a sidelink transmission resource, the target data is a multicast data, and an HARQ feedback mode of the target data is matched with the target resource; and the processing unit 1510 is configured to perform feedback processing according to the HARQ feedback mode.

Optionally, the receiving unit 1520 is further configured to receive first indication information, or resource pool configuration information; and the processing unit 1510 is further configured to: determine the HARQ feedback mode according to the first indication information or the resource pool configuration information, wherein the first indication information is used for indicating the HARQ feedback mode corresponding to the target data, and the resource pool configuration information is used for configuring the HARQ feedback mode corresponding to the target resource.

Optionally, that the HARQ feedback mode of the target data is matched with the target resource includes: the HARQ feedback mode of the target data is the same as that of the target resource.

Figure 16:
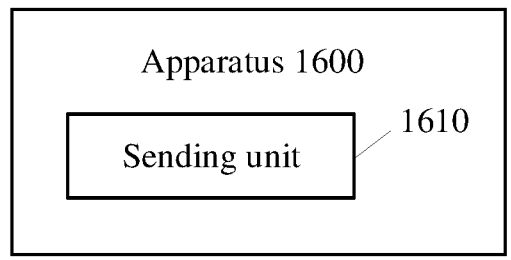
FIG. 16 is a schematic structural diagram of another apparatus for sidelink transmission according to the present application.

FIG. 16 is a schematic structural diagram of another apparatus for sidelink transmission according to the present application. The apparatus 1600 includes a sending unit 1610, configured to send at least one piece of feedback information of a target data through a multi-antenna transmission resource, wherein the target data is a sidelink data.

Optionally, the target data includes a first transport block and a second transport block, the at least one piece of feedback information includes feedback information of the first transport block and feedback information of the second transport block, and the multi-antenna transmission resource includes a first feedback resource and a second feedback resource, wherein the first feedback resource is used for transmitting the feedback information of the first transport block, and the second feedback resource is used for transmitting the feedback information of the second transport block.

Optionally, the target data includes a first transport block, the at least one piece of feedback information includes the feedback information of the first transport block, and the multi-antenna transmission resource includes the first feedback resource and the second feedback resource, wherein the first feedback resource and the second feedback resource are used for transmitting the feedback information of the first transport block.

Optionally, the target data includes the first transport block, the at least one piece of feedback information includes the feedback information of the first transport block, and the multi-antenna transmission resource includes the first feedback resource and the second feedback resource, wherein the first feedback resource is used for transmitting the feedback information of the first transport block.

Optionally, the apparatus 1600 further includes a receiving unit, configured to receive third indication information, wherein the third indication information is used for indicating a multi-antenna transmission scheme corresponding to a multi-antenna transmission resource, and the multi-antenna transmission resource is used for bearing the feedback information of the target data.

Figure 17:
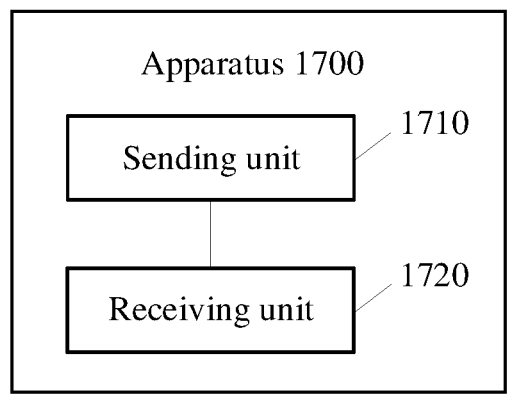
FIG. 17 is a schematic structural diagram of another apparatus for sidelink transmission according to the present application.

FIG. 17 is a schematic structural diagram of another apparatus for sidelink transmission according to the present application. The apparatus 1700 includes a sending unit 1710 and a receiving unit 1720. The receiving unit 1720 is configured to receive multicast member information from a terminal device; and the sending unit 1710 is configured to send configuration information to the terminal device, wherein the configuration information is used for configuring a hybrid automatic repeat request (HARQ) feedback mode of at least one sidelink data corresponding to the multicast member information.

Optionally, the multicast member information includes at least one piece of the following information: whether a quantity of multicast members corresponding to the at least one sidelink data is determined; the quantity of the multicast members corresponding to the at least one sidelink data; or quality of service (QoS) requirement corresponding to the at least one sidelink data.

Optionally, the configuration information includes at least one of the following three relationships: a corresponding relationship between the multicast member information and the HARQ feedback mode; a corresponding relationship between an attribute of a bearer or logical channel corresponding to the at least one sidelink data and the HARQ feedback mode; or a corresponding relationship between a channel quality measurement value corresponding to at least one sidelink transmission resource and the HARQ feedback mode, wherein the at least one sidelink resource is used for transmitting the at least one sidelink data.

Optionally, the sending unit 1710 is further configured to indicate or configure the HARQ feedback mode of the at least one sidelink transmission resource, wherein the at least one sidelink transmission resource is used for transmitting the at least one sidelink data.

Figure 18:
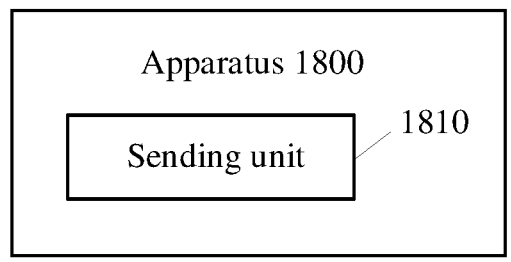
FIG. 18 is a schematic structural diagram of another apparatus for sidelink transmission according to the present application.

FIG. 18 is a schematic structural diagram of another apparatus for sidelink transmission according to the present application. The apparatus 1800 includes a sending unit 1810. The sending unit 1810 is configured to send transmission mode indication information to a terminal device, wherein the transmission mode indication information is used for indicating a transmission mode of a sidelink data when the terminal device receives an acknowledgement (ACK).

Optionally, the transmission mode includes stopping of transmission or a new transmission.

Figure 19:
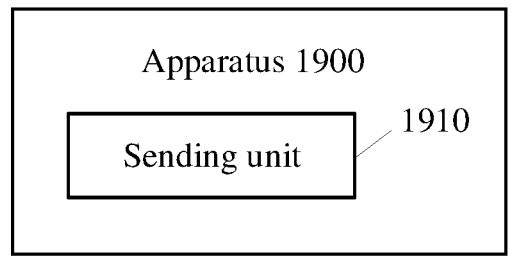
FIG. 19 is a schematic structural diagram of another apparatus for sidelink transmission according to the present application.

FIG. 19 is a schematic structural diagram of another apparatus for sidelink transmission according to the present application. The apparatus 1900 includes a sending unit 1910.

The sending unit 1910 is configured to send second indication information to a terminal device, wherein the second indication information is used for the terminal device to determine a target address corresponding to a target resource, the target resource is a sidelink transmission resource, and the target resource is used for a new transmission.

Optionally, the second indication information is a number of the target address, and the apparatus 1900 further includes a receiving unit, configured to receive a number of at least one transmission address from the terminal device, wherein the at least one transmission address includes the target address.

Optionally, the second indication information is used for indicating a transmission mode of the target resource, and there is an association relationship between the transmission mode of the target resource and the target address.

Figure 20:
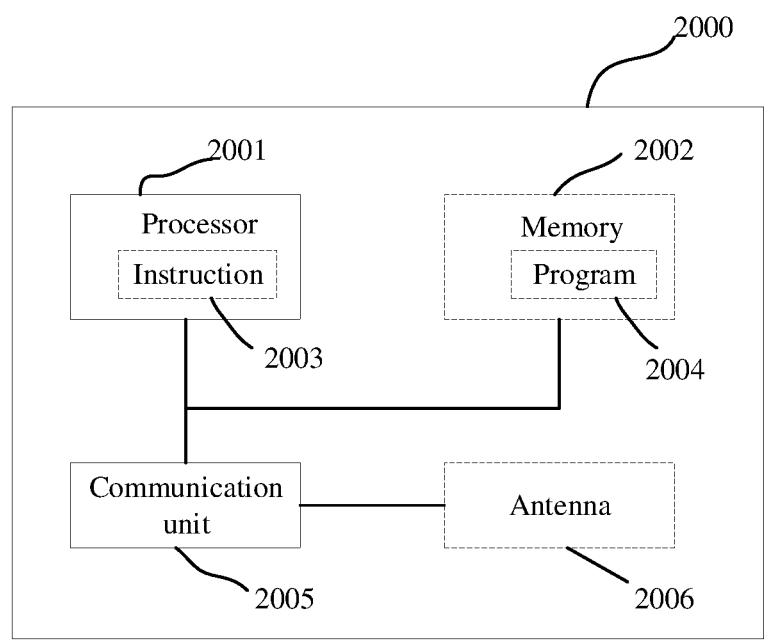
FIG. 20 is a schematic structural diagram of a device for sidelink transmission according to the present application.

FIG. 20 shows a schematic structural diagram of a device for sidelink transmission according to the present application. The dashed line in FIG. 20 indicates that the unit or the module is optional. A device 2000 may be configured to implement the method described in the above method embodiments. The device 2000 may be a terminal device, or a network device, or a chip.

The device 2000 includes one or more processors 2001, wherein the one or more processors 2001 may support the device 2000 to implement the methods in the method embodiments corresponding to FIG. 2 to FIG. 10. The processor 2001 may be a general purpose processor or a special purpose processor. For example, the processor 2001 may be a central processing unit (CPU). The CPU may be configured to control the device 2000, execute software programs, and process data of the software programs. The device 2000 may further include a communication unit 2005 configured to implement input (reception) and output (transmission) of signals.

For example, the device 2000 may be a chip, and the communication unit 2005 may be an input and/or output circuit of the chip, or the communication unit 2005 may be a communication interface of the chip, which may be a component of a terminal device or a network device or another wireless communication device.

For another example, the device 2000 may be the terminal device or the network device, and the communication unit 2005 may be a transceiver of the terminal device or the network device, or the communication unit 2005 may be a transceiver circuit of the terminal device or the network device.

The device 2000 may include one or more memories 2002 on which a program 2004 is stored, wherein the program 2004 may be executed by the processor 2001 to generate an instruction 2003, enabling the processor 2001 to execute the method described in the above method embodiments according to the instruction 2003. Optionally, data may also be stored in the memory 2002. Optionally, the processor 2001 may also read data stored in the memory 2002, wherein the data may be stored at a same storage address as the program 2004, or at a different storage address from the program 2004.

The processor 2001 and the memory 2002 may be disposed separately, or integrated together, for example, they may be integrated on a single board of the network device, or a system on chip (SOC) of the terminal device.

The device 2000 may also include an antenna 2006. The communication unit 2005 is configured to implement a transceiving function of the device 2000 by the antenna 2006.

A specific mode for the processor 2001 to implement the method shown in FIG. 2 to FIG. 10 may refer to the related description in the above method embodiments.

It should be understood that each act of the foregoing method embodiments may be implemented by a logic circuit in a form of hardware in the processor 2001 or instructions in a form of software. The processor 2001 may be a CPU, a digital signal processor (DSP), an application specific integrated circuit (ASIC), a field programmable gate array (FPGA), or another programmable logic device, such as a discrete gate, transistor logic device, or discrete hardware component.

The present application further provides a computer program product which, when executed by the processor 2001, implements the method described in any of the method embodiments in the present application.

The computer program product may be stored in the memory 2002, for example, the computer program may be a program 2004. The program 2004 is finally converted into an executable object file that can be executed by the processor 2001 after subjected to processing procedures such as preprocessing, compiling, assembling and linking.

The present application further provides a computer readable storage medium, in which a computer program is stored, and when the computer program is executed by a computer, the method described in any method embodiment in the present application is implemented. The computer program may be a high-level language program or an executable object program.

The computer readable storage medium, for example, is the memory 2002. The memory 2002 may be volatile memory or nonvolatile memory, or the memory 2002 may include both volatile memory and nonvolatile memory. The non-volatile memory may be a read-only memory (ROM), a programmable ROM (PROM), an erasable PROM (EPROM), an electrically erasable EPROM (EEPROM), or a flash memory. The volatile memory may be a Random Access Memory (RAM) which serves as an external cache. By illustration of example but not restriction, RAMs the processor 2001 are available such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM).

Those skilled in the art may clearly learn that for convenience and conciseness of description, specific working processes of the system, the apparatus, and the unit described above may refer to the corresponding processes in the aforementioned method embodiments, which will not be repeated here again.

In several embodiments provided by the present application, the disclosed systems, apparatuses and methods may be implemented in other ways. For example, some features of the method embodiments described above may be ignored or not performed. For example, the apparatus embodiments described above are only illustrative, the division of the units is only a logical function division, and there may be other division manners in actual implementation. Multiple units or components may be combined or integrated into another system. In addition, the coupling between units or components can be direct coupling or indirect coupling, which includes electrical, mechanical or other forms of connections.

It should be understood that in various embodiments of the present application, serial numbers of the foregoing processes do not mean an order of execution. The order of execution of the processes should be determined according to functions and internal logics of the processes, and should not impose any limitation on implementation processes of the embodiments of the present application.

In addition, the terms "system" and "network" are often used interchangeably herein. The term "and/or" in this document is merely an association relation describing associated objects, indicating that there may be three relations, for example, A and/or B may indicate three cases: A alone, A and B, and B alone. In addition, the symbol "/" herein generally indicates that there is a "or" relationship between the associated objects before and after "/".

In general, the above descriptions are only preferred embodiments of the present application and are not intended to limit the protection scope of the present application. Any modification, equivalent substitution, improvement, etc. made within the spirit and principle of the present application shall be included in the protection scope of the present application.

What is claimed is:

1. A method for transmitting sidelink data, applied to a vehicle to everything (V2X) communication system, comprising:
   determining, by a terminal device, a transmission mode of a target data, wherein the transmission mode comprises a new transmission or a retransmission, and the target data is a sidelink data; wherein determining, by the terminal device, the transmission mode of the target data, comprising:
   when the terminal device receives a positive acknowledgement (ACK) and a new data indication (NDI) received from a network device and by the terminal device and corresponding to a target resource is not toggled relative to a previous adjacent NDI received by the terminal device, the terminal device determines that the transmission mode of the target data is the new transmission, wherein the target resource is a sidelink transmission resource bearing the target data and corresponds to a first HARQ process.

2. The method of claim 1, wherein
   when a quantity of bits of a transport block that the target resource is capable of transmitting present time changes compared with a quantity of bits of a transport block that the target resource is capable of transmitting last time, the transmission mode is the new transmission.

3. A method for transmitting sidelink data, comprising:
   sending, by a network device, transmission mode indication information to a terminal device, wherein the transmission mode indication information is used for indicating a transmission mode of a sidelink data when the terminal device receives an acknowledgement (ACK); wherein, when the terminal device receives the positive ACK and a new data indication (NDI) received from the network device and by the terminal device and corresponding to a target resource is not toggled relative to a previous adjacent NDI received by the terminal device, the terminal device determines that the transmission mode of the sidelink data is the new transmission, wherein the target resource is a sidelink transmission resource bearing the sidelink data and corresponds to a first HARQ process.

4. The method of claim 3, wherein the transmission mode comprises stopping of transmission or a new transmission.

5. A terminal device, comprising: a processor and a memory, wherein the memory is configured to store a computer program, and the processor is configured to call and run the computer program stored in the memory to perform the following act:
   determining a transmission mode of a target data, wherein the transmission mode comprises a new transmission or a retransmission, and the target data is a sidelink data; wherein, when the terminal device receives a positive acknowledgement (ACK) and a new data indication NDI) received from a network device and by the terminal device and corresponding to a target resource is not toggled relative to a previous adjacent NDI received by the terminal device, the processor is configured to call and run the computer program stored in the memory to perform the following act: determining that the transmission mode of the target data is the new transmission, wherein the target resource is a sidelink transmission resource bearing the target data and corresponds to a first HARQ process.

6. The terminal device of claim 5, wherein
when a quantity of bits of a transport block that the target resource is capable of transmitting present time changes compared with a quantity of bits of a transport block that the target resource is capable of transmitting last time, the transmission mode is the new transmission.

7. A network device comprising a processor and a memory, wherein the memory is used for storing a computer program, and the processor is configured to call and run the computer program stored in the memory to perform the method of claim 3.

8. The network device of claim 7, wherein the transmission mode comprises stopping of transmission or a new transmission.

* * * * *